United States Patent
Nagata

(10) Patent No.: US 7,782,332 B2
(45) Date of Patent: Aug. 24, 2010

(54) IMAGE DISPLAYING DEVICE

(75) Inventor: Hiroshi Nagata, Tokyo (JP)

(73) Assignee: Olympus Corporation, Tokyo (JP)

( * ) Notice: Subject to any disclaimer, the term of this patent is extended or adjusted under 35 U.S.C. 154(b) by 921 days.

(21) Appl. No.: 11/104,144

(22) Filed: Apr. 11, 2005

(65) Prior Publication Data

US 2005/0246496 A1    Nov. 3, 2005

(30) Foreign Application Priority Data

| Apr. 30, 2004 | (JP) | ............................. 2004-135113 |
| Apr. 30, 2004 | (JP) | ............................. 2004-135114 |
| Apr. 30, 2004 | (JP) | ............................. 2004-135115 |
| Apr. 30, 2004 | (JP) | ............................. 2004-135116 |

(51) Int. Cl.
*G06F 12/00* (2006.01)
*H04N 5/76* (2006.01)

(52) U.S. Cl. .................................... 345/564; 348/231.2

(58) Field of Classification Search ................ 345/564, 345/565; 711/204; 348/231.2
See application file for complete search history.

(56) References Cited

U.S. PATENT DOCUMENTS

| 5,293,232 | A  | * | 3/1994  | Seki et al. ..................... 348/715 |
| 6,191,811 | B1 | * | 2/2001  | Nishimura et al. ............. 348/96 |
| 6,816,189 | B2 | * | 11/2004 | Nagaoka et al. ........... 348/231.2 |
| 6,992,710 | B2 | * | 1/2006  | Nagaoka ................... 348/231.2 |
| 7,499,084 | B2 | * | 3/2009  | Kurakata ................... 348/231.2 |
| 2003/0020745 | A1 |   | 1/2003  | Kawaguchi et al. |
| 2006/0082661 | A1 | * | 4/2006  | Lee et al. .................. 348/231.2 |

FOREIGN PATENT DOCUMENTS

| JP | 5-158775    | 6/1993 |
| JP | 06-075833   | 3/1994 |
| JP | 6-75833     | 3/1994 |
| JP | 11-175376   | 2/1999 |
| JP | 2002-140222 | 5/2002 |
| JP | 2004-80615  | 3/2004 |

OTHER PUBLICATIONS

English language machine translation of JP06-075833, Uejima Takeji, published Mar. 18, 1994, machine translated on Jun. 12, 2008 by Japanese Patent Office WebSite, pp. 1-9.*
Office Action dated Sep. 1, 2009 issued in co-pending Japanese Patent Application No. 2004-135114.
Office Action dated Sep. 1, 2009 issued in co-pending Japanese Patent Application No. 2004-135115.

* cited by examiner

*Primary Examiner*—Jeffery A Brier
(74) *Attorney, Agent, or Firm*—Volpe and Koenig, P.C.

(57) ABSTRACT

An image displaying device comprises a reproduction list creating unit for creating a group of image data within a prescribed range in which a frame number "1" is included and the frame number increases as a first reproduction list and for creating a group of image data within a prescribed range in which a largest frame number is included and the frame number decreases as a second reproduction list, a display controlling unit for reproducing and displaying image data of a frame to be reproduced registered in the second reproduction list in the case that the frame number is set in a direction along which the frame number decreases below the frame number "1" while image data registered in the first reproduction list is reproduced.

7 Claims, 14 Drawing Sheets

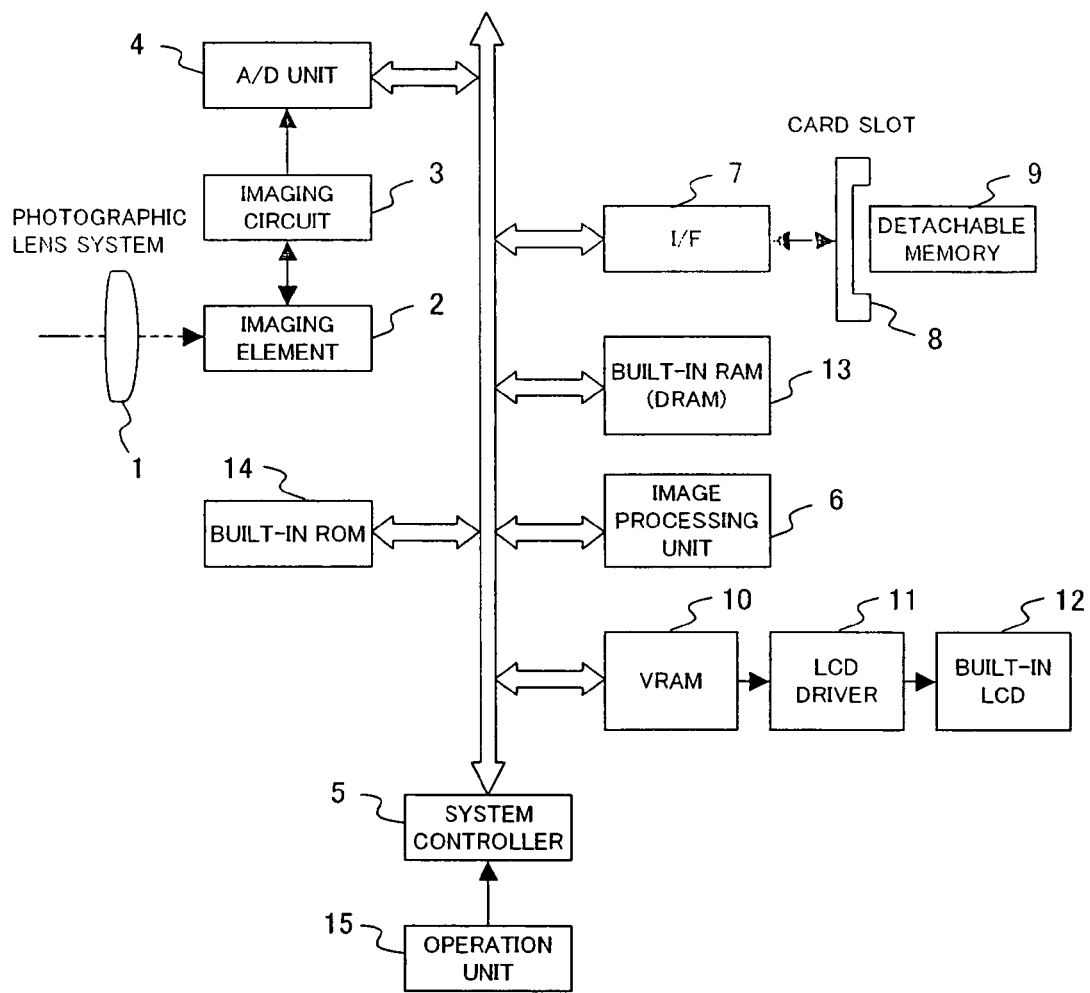
F I G. 3

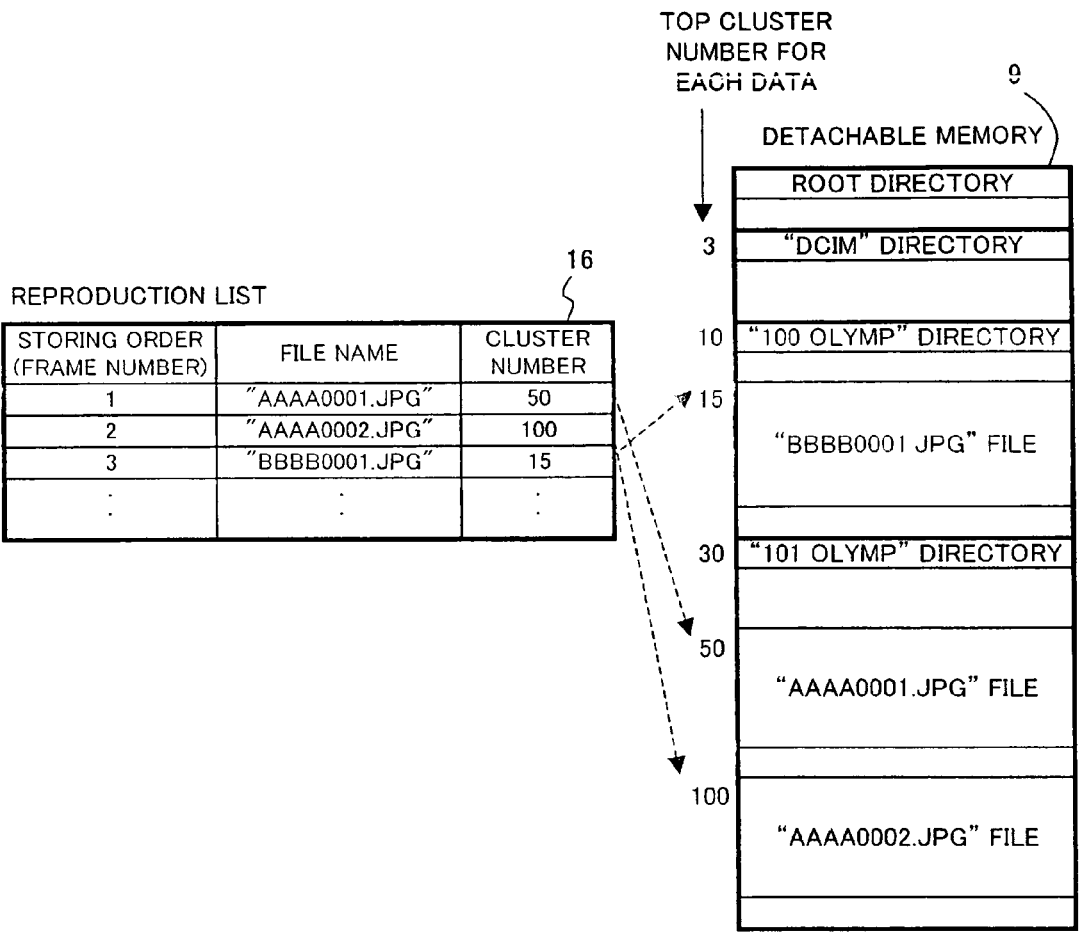
F I G. 4

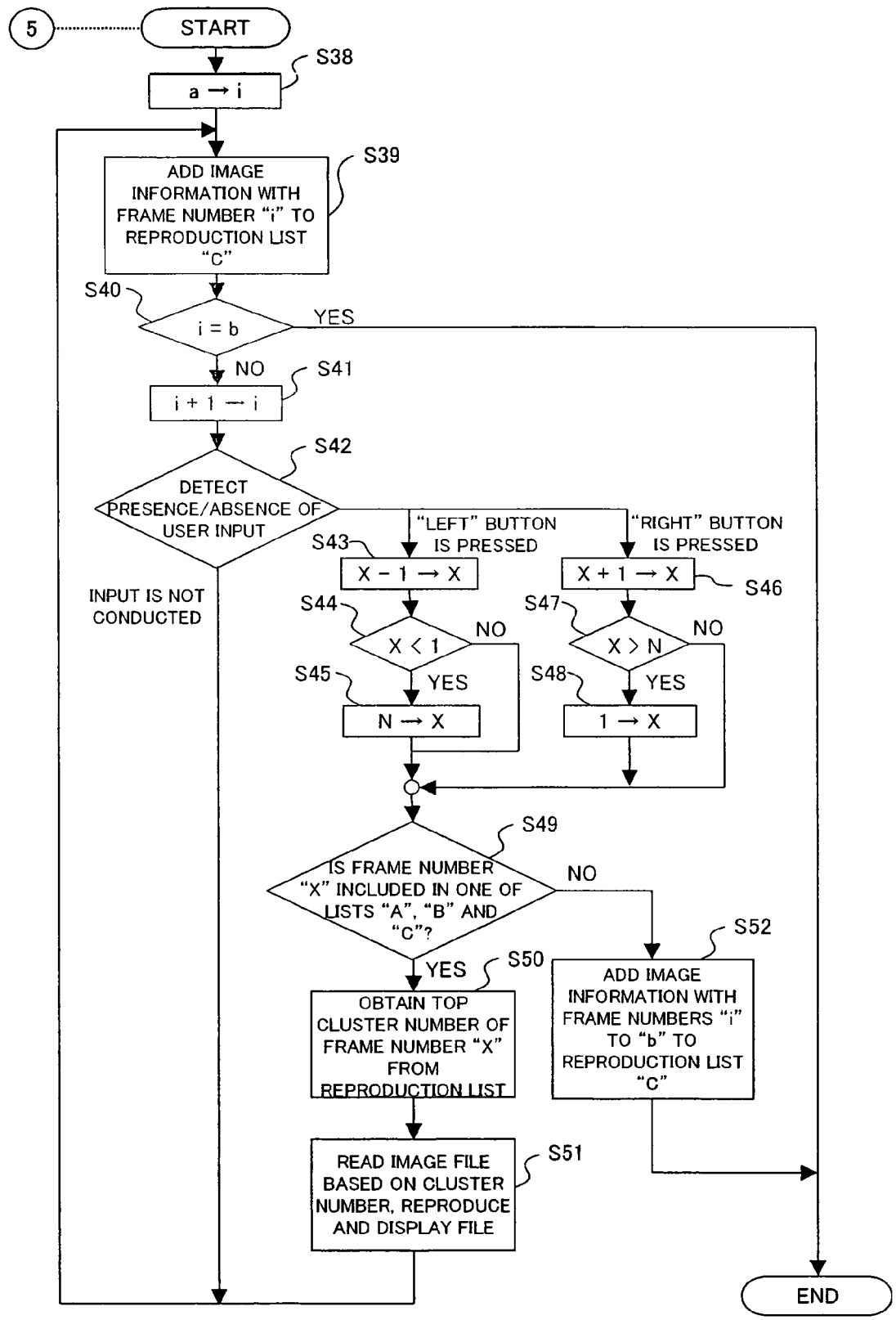
F I G. 7

US 7,782,332 B2

IMAGE DISPLAYING DEVICE

CROSS REFERENCE TO RELATED APPLICATIONS

This application is based upon and claims the benefit of priority from the prior Japanese Patent Applications No. 2004-135113, filed Apr. 30, 2004; No. 2004-135114, filed Apr. 30, 2004; No. 2004-135115, filed Apr. 30, 2004; and No. 2004-135116, filed Apr. 30, 2004, the entire contents of which are incorporated herein by reference.

BACKGROUND OF THE INVENTION

1. Field of the Invention

The present invention relates to an image displaying device for reading image data which is assigned frame numbers from a recording medium in order to reproduce and display the image data.

2. Description of the Related Art

In recent years, many electronic cameras comprise image display functions for reproducing and displaying image files which have been recorded on recording media by photography, as occasion demands.

In an electronic camera such as the above, the image files obtained by photography are recorded on a recording medium such as a detachable memory card or the like in accordance with a hierarchy, for example, as shown in FIG. 1, based on a particular format such as DCF (Design rule for Camera File system) or the like.

FIG. 2 shows an example of the data structure of a memory card in which image files are recorded as above. However, it is to be noted that the memory card shown in FIG. 2 is a memory card that is managed by the FAT (File Allocation Tables) system. As shown in FIG. 2, in the memory card, directory areas and image file areas are provided. Each one of the directory areas records, as directory information, a top cluster number for an area recording directory information or image file located on a level that is one level lower than the directory, and each one of the image file areas records the image file itself. Accordingly, by sequentially tracing the above top cluster numbers from a root directory area, a desired image file can be accessed. For example, by sequentially tracing, from the root directory area, a "DCIM" directory area with a top cluster number "3" and a "100OLYMP" directory area with a top cluster number "10", a "AAAA0001.jpg" file with a top cluster number "50" can be accessed.

Japanese Patent Application Publication No. 6-75833 discloses a file management device. Specifically, in order to conduct an inversion reproduction process of a video file, the device divides the video file into a plurality of division files and creates a control file in which the reproduction order of the plurality of the division files which have been divided is registered. When the inversion reproduction process of the video file is conducted, the inversion reproduction process is conducted by sequentially reading data from the plurality of the division files based on the created control file. Thereby, smooth inversion reproduction can be realized without wasting time reading data.

In other words, the above Japanese Patent Application Publication No. 6-75833 discloses a technique for conducting smooth reproduction of an image without wasting time reading data, by dividing the image to be reproduced into a plurality of groups and creating a control file in which the reproduction order of the image is registered, i.e. a technique of controlling the reproduction order of the image files which already exist.

SUMMARY OF THE INVENTION

An image displaying device according to a first aspect of the present invention reads image data which is assigned frame numbers from a recording medium in order to reproduce and display the image data, and comprises a reproduction list creating unit for creating a group of image data within a prescribed range in which a frame number "1" is included and the frame number increases as a first reproduction list, and for creating a group of image data within a prescribed range in which a largest frame number is included and the frame number decreases as a second reproduction list, a frame number setting unit for setting a frame number to be reproduced and displayed, and a display controlling unit for reproducing and displaying image data of a frame to be reproduced registered in the second reproduction list in the case that the frame number is set in a direction along which the frame number decreases below the frame number "1" while image data registered in the first reproduction list is reproduced, and for reproducing and displaying image data of a frame to be reproduced registered in the first reproduction list in the case that the frame number is set in a direction along which the frame number increases above the largest frame number while image data registered in the second reproduction list is reproduced.

An image displaying device according to a second aspect of the present invention reads image data which is assigned frame numbers from a recording medium in order to reproduce and display the image data, and comprises a reproduction list creating unit for creating a group of image data within a prescribed range in which a largest frame number is included and the frame number decreases as a second reproduction list, a list adding unit for adding frame numbers, when new image data is added and recorded in the recording medium, corresponding to the added image data to the reproduction list as a list, and a list deleting unit for deleting, when the new list is added to the reproduction list, the old list existing in the reproduction list for the same amount of image data as the added image data.

An image displaying device according to a third aspect of the present invention is capable of reproducing and displaying image data, and comprises a frame number specifying unit for specifying a frame number of image data to be reproduced and displayed, a first reproduction list creating unit for creating, as a first reproduction list, a group of frame numbers in which the specified frame number is within a prescribed range of a direction along which the specified frame number increases by using the specified frame number as a reference, and a group of frame numbers in which the specified frame number is within a prescribed range of a direction along which the specified frame number decreases by using the specified frame number as a reference, a scope determining unit for determining, when the frame number is updated in an increasing direction by the frame number specifying unit, whether or not the updated frame number is within a first scope of frames with frame numbers between a largest frame number and a frame number smaller than the largest frame number by the prescribed number in the first reproduction list, or for determining, when the frame number is updated in an decreasing direction by the frame number specifying unit, whether or not the updated frame number is within a second scope of frames with frame numbers between a smallest frame number and a frame number larger than the smallest frame number by the prescribed number in the first reproduction list, and a second reproduction list creating unit for creating, when it is determined that the frame number updated by the frame number specifying unit is within the first scope, a group of frame numbers which further increase above the largest frame number by the prescribed number as a second reproduction list and for creating, when it is determined that the frame number updated by the frame number specifying unit is within the second scope, a group of frame numbers which further decrease below the smallest frame number by the prescribed number as a second reproduction list.

An image displaying device according to a fourth aspect of the present invention reads image data which is assigned frame numbers from a recording medium in order to reproduce and display the image data, and comprises a first reproduction list creating unit for creating a first reproduction list including image information for image data each with frame numbers within a prescribed range in which the frame numbers are consecutive, a second reproduction list creating unit for creating a second reproduction list including first image information for image data each with frame numbers within a prescribed range of frame numbers which are not included in the first reproduction list and are consecutive with the smallest frame number included in the first reproduction list when a frame number to be reproduced decreases and lies within a first range in which frame numbers are consecutive in a direction along which the frame number increases from the smallest frame number included in the first reproduction list, or for creating a second reproduction list including second image information for image data each with frame numbers within a prescribed range of frame numbers which are not included in the first reproduction list and are consecutive with the largest frame number included in the first reproduction list when a frame number to be reproduced increases and lies within a second range in which frame numbers are consecutive in a direction along which the frame number decreases from the largest frame number included in the first reproduction list, and a deleting unit for deleting, when a frame number to be reproduced lies within frame numbers which are included in the first reproduction list and are outside the first range while the second reproduction list including the first image information is created, the second reproduction list including the first image information during creation or for, deleting, when a frame number to be reproduced lies within frame numbers which are included in the first reproduction list and are outside the second range while the second reproduction list including the second image information is created, the second reproduction list including the second image information during creation.

BRIEF DESCRIPTION OF THE DRAWINGS

FIG. 3 shows an overview of the configuration of an electronic camera according to a first embodiment of the present invention;

FIG. 4 shows an example of a reproduction list stored in a DRAM;

FIG. 7 is a fourth flowchart showing an example of operations of the electronic camera according to the first embodiment;

DESCRIPTION OF THE PREFERRED EMBODIMENTS

Figure 1:
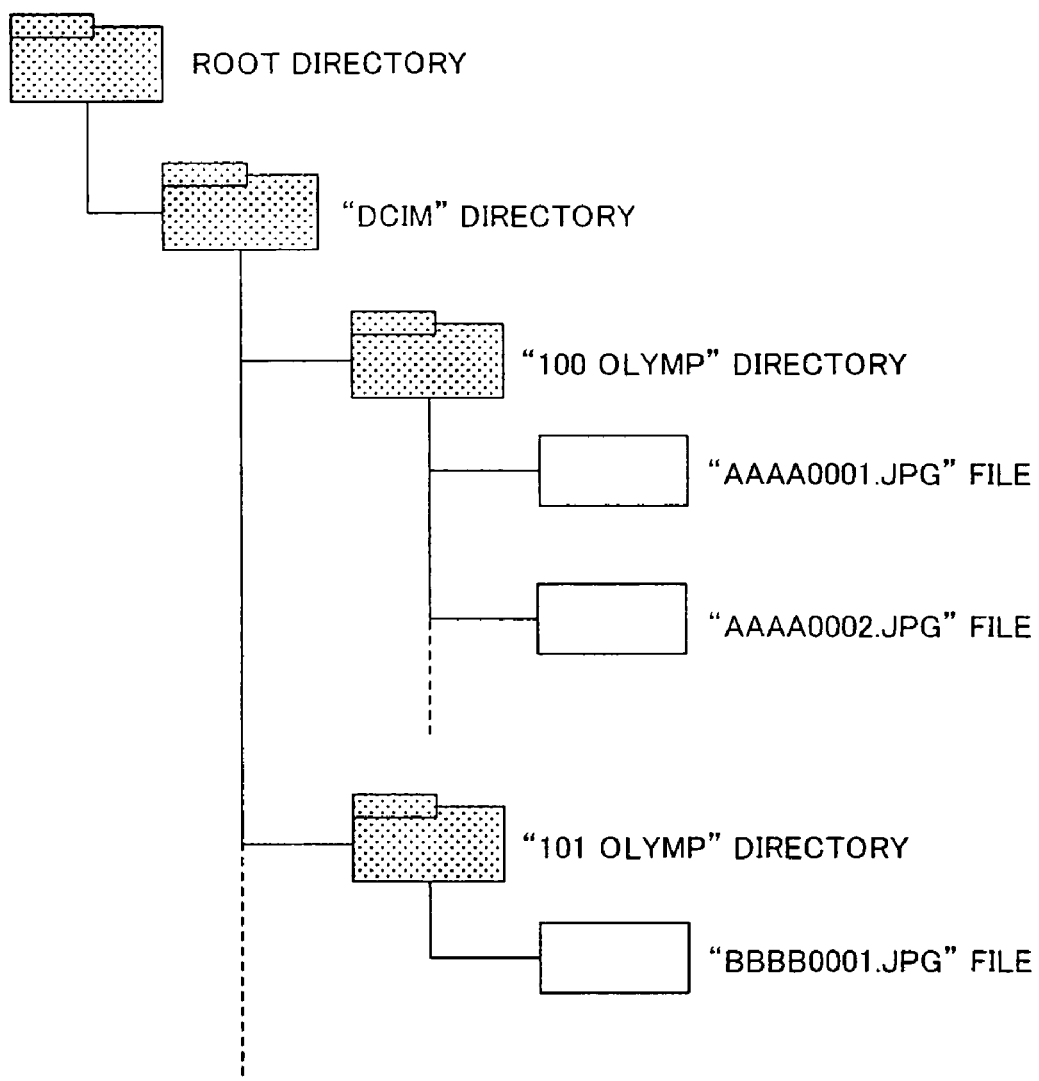
FIG. 1 shows an example of image files recorded in a recording medium in accordance with a hierarchy based on a particular format.
Figure 2:
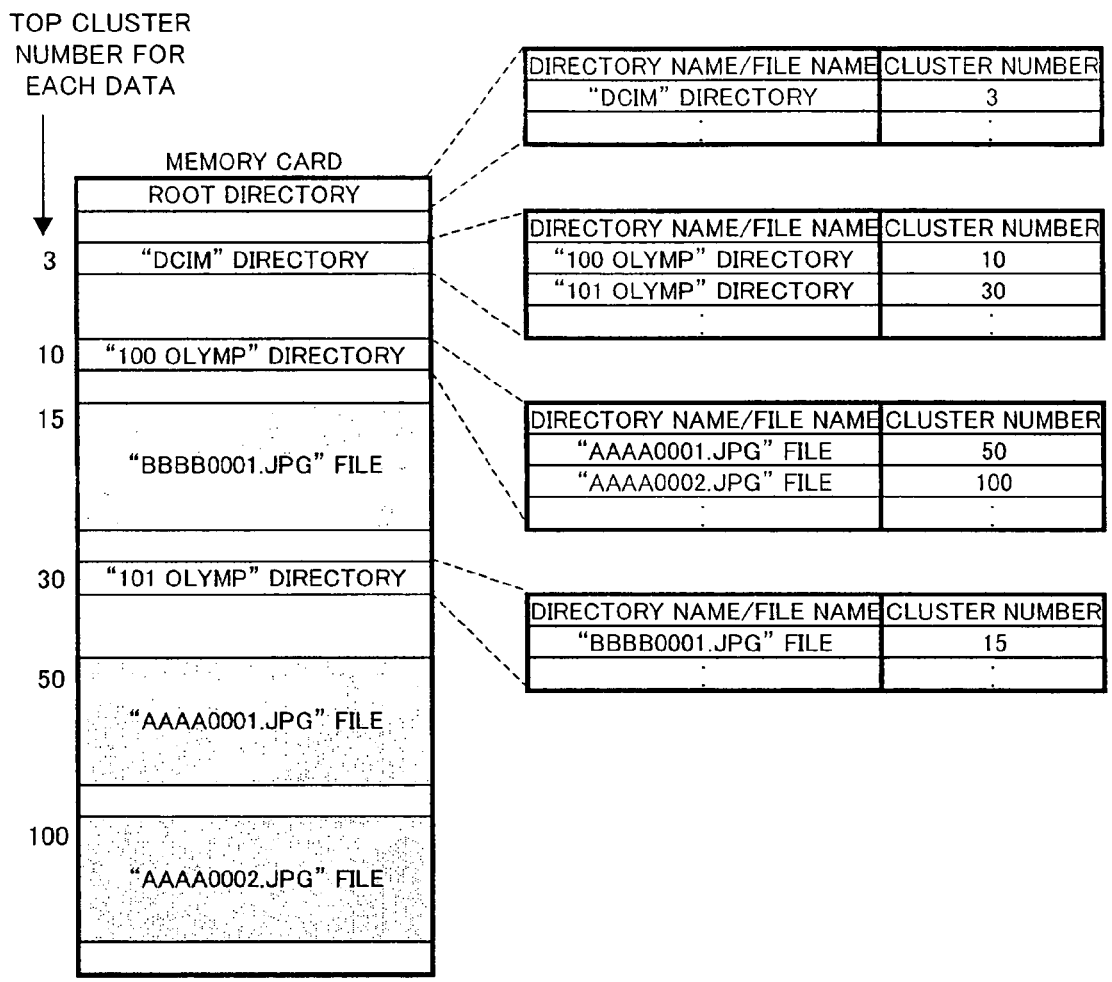
FIG. 2 shows an example of a data structure of a memory card in which the image files are recorded.

Hereinafter, embodiments of the present invention are explained by referring to the drawings.

First Embodiment

FIG. 3 shows an overview of the configuration of an electronic camera to which an image displaying device according to a first embodiment of the present invention is applied.

Note that it is assumed herein that the electronic camera is based on the DCF and records image files in a recording medium in accordance with the previously described hierarchy shown in FIG. 1. Also, it is assumed that as a file system, the FAT file system is employed.

In the electronic camera in FIG. 3, an image of a subject which has been imaged by a photographic lens system 1 is photo-electrically converted into an electric signal by an imaging element 2, and is subjected to a prescribed imaging process by an imaging circuit 3, thereafter, the image data of the subject is converted from analog to digital by an A/D unit 4. Further, thus obtained image data is subject to a prescribed image process by a system controller 5, thereafter, the image data is subject to a prescribed compression process by an image processing unit 6, and is recorded as an image file in detachable memory 9 inserted into a card slot 8 via an I/F 7. Additionally, the detachable memory 9 is a recording medium whose recorded contents are not erased even when the power supply of the electronic camera is turned off.

The image file recorded in the detachable memory 9 inserted into the card slot 8 is read via the I/F 7 in accordance with an image reproduction instruction, and is subject to a prescribed expansion process by the image processing unit 6, and thereafter, is subject to a prescribed image process by the system controller 5, and is stored in a VRAM 10. Then, the image file is read by a LCD driver 11 and the image of the read image file is displayed on a built-in LCD 12.

There is also DRAM 13 which is built-in RAM, and is memory used for temporarily storing the image data which has been A/D converted by the A/D unit 4, for temporarily storing the image data which is under a process by the image processing unit 6, and as a working area for the system controller 5 to execute control processes. Further, a reproduction list (which will be described later) created by the system controller 5 is stored in the DRAM 13.

The system controller 5 comprises a CPU (Central Processing Unit) and reads and executes a camera program stored in built-in ROM 14, and controls the entire operation of the electronic camera, including, for example, creation/addition to/deletion of the reproduction list which will be described later.

An operation unit 15 comprises various buttons, switches and the like to be operated by a user such as, for example, a release button for supplying a photography instruction, a cross shaped button for supplying a frame switching instruction of reproduced images or for moving a displayed cursor and the like (an example of frame number setting unit), an "OK" button for selecting an item, a "Power" button for turning on/off the power supply, a mode switching switch for switching various modes such as a photography mode, a reproduction mode and the like, and receives various instructions from the user and notifies the system controller 5. For example, when a "Left" button or a "Right" button on the cross shaped button is pressed, a frame number update signal is input to the system controller 5.

Next, the reproduction list stored in the DRAM 13 is explained.

The reproduction list is created, added and deleted by the system controller 5, and indicates the correspondence among the frame number which is the storage order of an image file in the detachable memory 9, the file name of the image file and a top cluster number for an area in the detachable memory 9 recording the image file, regarding each of the image files (image data) of the particular number of image files recorded in the detachable memory 9.

Upon the reproduction of the image, the top cluster number of an image file with a frame number to be reproduced is obtained by referring to the above reproduction list so that the image file is read and reproduced by a direct access to the area which starts from the top cluster number in the detachable memory 9. Accordingly, the time required for the access of the image file is reduced in order that a smooth reproduction of the images in accordance with reproduction instructions can be realized.

FIG. 4 shows an example of the reproduction list stored in the DRAM 13.

As shown in FIG. 4, in the reproduction list 16, the correspondence among the frame number, the file name and the top cluster number is indicated, regarding each image file of the particular number recorded in the detachable memory 9. When an image file with the frame number "1" is to be reproduced for example, a corresponding cluster number "50" is firstly obtained by referring to the reproduction list 16, and an area with the cluster number "50" in the detachable memory 9 is directly accessed so that a file "AAAA0001.JPG" is read and the image of that file is reproduced.

Hereinafter, the set of a frame number, a file name and a top cluster number corresponding to one another is also referred to as image information with the corresponding frame number, or as image information of the corresponding file name. For example, in the example of FIG. 4, the set of the frame number "1", the file name "AAAA0001.jpg" and the top cluster number "50" is also referred to as image information with the frame number "1", or as image information of the image file "AAAA0001.jpg".

Additionally, a frame number corresponds to a reproduction order in the present embodiment.

Next, as operations of the electronic camera, operations conducted when the power supply of the electronic camera is turned on or when a reproduction mode is set for the first time are explained.

FIG. 5A, FIG. 6A, FIG. 6B and FIG. 7 are flow charts showing an example of the above operations. FIG. 5B shows the concept of the reproduction list which is created, added to and deleted by the above operations.

Firstly, the reproduction lists "A", "B" and "C" used for the above operations are explained.

As shown in FIG. 5B, in the above operations, the total number of image files (image data) stored in the detachable memory 9 is assumed to be "N" (where "N"≧500) and a frame number is assigned to each of the "N" image files. The reproduction list "A" includes image information for one hundred frames, located at the back of, and including, the frame number "1". The reproduction list "B" includes image information for one hundred frames, located in front of, and including, the frame number "N". And, the reproduction list "C" includes image information for frames of a particular number with consecutive frame numbers other than the frame numbers included in the reproduction list "A" or the reproduction list "B". In the above operations, the word "front" means a direction along which the frame number decreases, and the word "back" means a direction along which the frame number increases.

Next, the above operations are explained in detail by referring to FIG. 5A, FIG. 6A, FIG. 6B and FIG. 7.

Figure 5A:
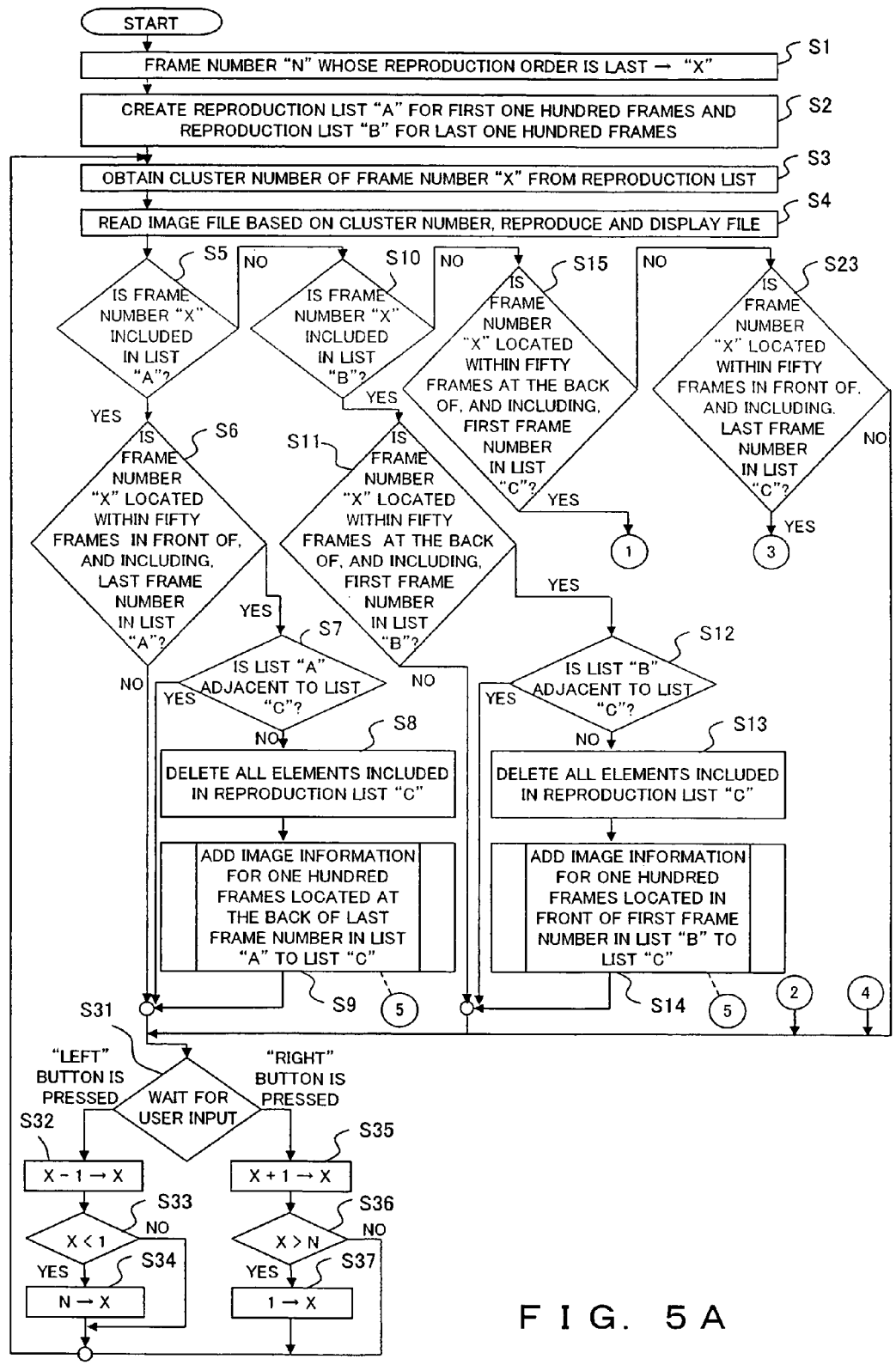
FIG. 5A is a first flowchart showing an example of operations of the electronic camera according to the first embodiment.
Figure 5B:
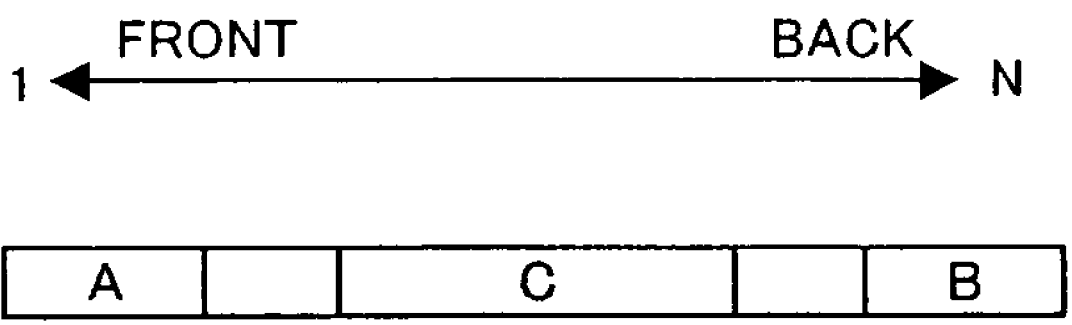
FIG. 5B shows the concept of a reproduction list which is created, added to and deleted by operations of the electronic camera.

When the above operations are started, as shown in FIG. 5A, initially the frame number "N" whose reproduction order is the last is set as "X" which serves as a frame number to be reproduced (S1), and the reproduction list "A" including image information for one hundred frames, located at the back of, and including, the frame number "1", and the reproduction list "B" including image information for one hundred frames, located in front of, and including, the frame number "N" are created (S2) so that both of the reproduction lists "A" and "B" are stored in the built-in RAM 13. Additionally, the image data of the image file with the frame number "N" is the image data which has been imaged and recorded in the detachable memory last.

Next, the cluster number of the frame number "X" is obtained from the reproduction list stored in the built-in RAM 13 (S3) and the corresponding image file is read from the detachable memory 9 so that the image of the above read image file is displayed in the built-in LCD 12 (S4).

Next, it is determined whether or not the frame number "X" is included in the reproduction list "A" (S5), if the determination result is YES, the process proceeds to S6, if however the determination result is NO, the process proceeds to S10.

When the determination result of the above S5 is YES, it is subsequently determined whether or not the frame number "X" is located within fifty frames, in front of, and including, the last frame number (i.e. the frame number nearest to the back of the list) in the reproduction list "A" (S6), if the determination result is YES, the process proceeds to S7, if however the determination result is NO, the process proceeds to S31.

When the determination result of the above S6 is YES, it is subsequently determined whether or not the last frame number in the reproduction list "A" is adjacent to (consecutive with) the first frame number (i.e. the frame number nearest to the front of the list) in the reproduction list "C" (S7), if the determination result is YES, the process proceeds to S31, if however the determination result is NO, the process proceeds to S8. Additionally, if the reproduction list "C" does not exist upon the determination of S7, the determination result of S7 is NO.

When the determination result of the above S7 is NO, all of the elements (image information) included in the reproduction list "C" are deleted (S8) and the process proceeds to S9. However, if the reproduction list "C" does not exist upon S8, the process proceeds to S9 without executing any processes.

In S9, image information for one hundred frames located consecutively at the back of the last frame number in the reproduction list "A" is added to the reproduction list "C" and the process proceeds to S31. However, if the reproduction list "C" does not exist upon S9, the reproduction list "C" including the image information for the above one hundred frames is created and stored in the built-in RAM 13.

If however, the determination result of the above S5 is NO, it is subsequently determined whether or not the frame number "X" is included in the reproduction list "B" (S10), if the determination result is YES, the process proceeds to S11, however if the determination result is NO, the process proceeds to S15.

If the determination result of the above S10 is YES, it is subsequently determined whether or not the frame number "X" is located within fifty frames, at the back of, and including, the first frame number in the reproduction list "B" (S11), if the determination result is YES, the process proceeds to S12, however if the determination result is NO, the process proceeds to S31.

When the determination result of the above S11 is YES, it is subsequently determined whether or not the first frame number in the reproduction list "B" is adjacent to (consecutive with) the last frame number in the reproduction list "C" (S12), if the determination result is YES, the process proceeds to S31, if however the determination result is NO, the process proceeds to S13. Additionally, if the reproduction list "C" does not exist upon the determination of S12, the determination result of S12 is NO.

When the determination result of the above S12 is NO, all of the elements (image information) included in the reproduction list "C" are deleted (S13) and the process proceeds to S14. However, if the reproduction list "C" does not exist upon S13, the process goes to S14 without executing any processes.

In S14, image information for one hundred frames located consecutively in front of the first frame number in the reproduction list "B" is added to the reproduction list "C" and the process proceeds to S31. However, if the reproduction list "C" does not exist upon S14, a reproduction list "C" including the image information for the above one hundred frames is created and stored in the built-in RAM 13.

Conversely, when the determination result of the above S10 is NO, it is subsequently determined whether or not the frame number "X" is within fifty frames, located at the back of, and including, the first frame number in the reproduction list "C" (S15), if the determination result is YES, the process proceeds to S16 in FIG. 6A, however if the determination result is NO, the process proceeds to S23.

When the determination result of the above S15 is YES, it is subsequently determined whether or not the last frame number in the reproduction list "A" is adjacent to (consecutive with) the first frame number in the reproduction list "C" (S16) as in FIG. 6A, if the determination result is YES, the process proceeds to S31 in FIG. 5A, however if the determination result is NO, the process proceeds to S17.

When the determination result of the above S16 is NO, it is subsequently determined whether or not the total number of frames existing between the last frame number in the reproduction list "A" and the first frame number in the reproduction list "C" is smaller than one hundred (S17), if the determination result is YES, the above total number of the frames is set as "n" (S18), if however the determination result is NO, "n" is set to "100" (S19). Next, image information for "n" frames located consecutively in front of the first frame number in the reproduction list "C" is added to the reproduction list "C" (S20).

Next, it is determined whether or not the total number of frames included in the reproduction list "C" is larger than three hundred (S21), if the determination result is YES, image information for "n" frames, located in front of, and including, the last frame number in the reproduction list "C" is deleted from the reproduction list "C" (S22), if however the determination result is NO, the process skips S22 and proceeds to S31 of FIG. 5A.

Conversely, when the determination result of the above S15 is NO, it is subsequently determined whether or not the frame number "X" is within fifty frames, located in front of, and including, the last frame number in the reproduction list "C" (S23), if the determination result is YES, the process proceeds to S24 in FIG. 6B, if however the determination result is NO, the process proceeds to S31.

When the determination result of the above S23 is YES, it is subsequently determined whether or not the first frame number in the reproduction list "B" is adjacent to (consecutive with) the last frame number in the reproduction list "C" (S24) as in FIG. 6B, if the determination result is YES, the process proceeds to S31 in FIG. 5A, if however the determination result is NO, the process proceeds to S25.

When the determination result of the above S24 is NO, it is subsequently determined whether or not the total number of frames existing between the first frame number in the reproduction list "B" and the last frame number in the reproduction list "C" is smaller than one hundred (S25), if the determination result is YES, the above total number of the frames is set as "n" (S26), if however the determination result is NO, "n" is set to "100" (S27). Next, image information for "n" frames located consecutively at the back of the last frame number in the reproduction list "C" is added to the reproduction list "C" (S28).

Next, it is determined whether or not the total number of frames included in the reproduction list "C" is larger than three hundred (S29), if the determination result is YES, image information for "n" frames, located at the back of, and including, the first frame number in the reproduction list "C" is deleted from the reproduction list "C" (S30), if however the determination result is NO, the process skips S30 and proceeds to S31 of FIG. 5A.

Thereafter, in FIG. 5A, the process waits for input of instructions by a user in S31. In S31, when it is detected that the "Left" button of the cross shaped button is pressed, "X" is set to "X−1" (S32), and it is subsequently determined whether or not "X" is smaller that one (S33), if the determination result is YES, "X" is set to "N" (S34), if however the determination result is NO, the process skips S34 and returns to S3.

On the other hand, when it is detected that the "Right" button of the cross shaped button is pressed in S31, "X" is set to "X+1" (S35) and it is subsequently determined whether or not "X" is larger than "N" (S36), if the determination result is YES, "X" is set to "1" (S37), if however the determination result is NO, the process skips S37 and returns to S3.

Additionally, regarding the above processes, the previously described S9, S14, S20 and S28 can detect that the "Right" button or the "Left" button of the cross shaped button is pressed even while the above steps are executed so that the corresponding image can be displayed when the pressing operation on one of the above buttons is detected.

FIG. 7 is a flowchart showing process of the previously described S9, S14, S20 and S28.

In FIG. 7, it is assumed that image information to be added to the reproduction list "C" is the image information with frame numbers from frame number "a" to frame number "b" (in other words, the image information for (b−a+1) frames). Firstly, "a" (the first frame number to be added to the reproduction list "C") is set as "i" (S38) and image information with a frame number "i" is added to the reproduction list "C" (S39).

Next, it is determined whether or not "i" equals "b" ("b" is the last frame number to be added to the reproduction list "C") (S40), if the determination result of S40 is YES, the present flow is ended, if however the determination result is NO, "i" is set to "i+1" (S41).

Next, the presence/absence of the input of instructions by a user is detected (S42) and when there is no input of instructions, the process returns to S39.

If however, it is determined that the "Left" button of the cross shaped button is pressed in S42, the same processes as those previously described, of S32 to S34, are executed (S43 to S45). Specifically, "X" is set to "X−1" (S43) and it is subsequently determined whether or not "X" is smaller than one (S44), if the determination result is YES, "X" is set to "N" (S45) and the process proceeds to S49. When it is determined that the "Right" button of the cross shaped button is pressed, the same processes as those previously described, of S35 to S37, are executed (S46 to S48). Specifically, "X" is set to "X+1" (S46) and it is subsequently determined whether or not "X" is larger than "N" (S47), if the determination is YES, "X" is set to "1" (S48) and the process proceeds to S49.

In subsequent S49, it is determined whether or not the frame number "X" is included in one of the reproduction lists "A", "B" and "C", and when the determination result is YES, the top cluster number of the frame number "X" is obtained from the reproduction list (S50) and the corresponding image file is read from the detachable memory 9 so that the image of the file is displayed on the built-in LCD 12 (S51).

Conversely, when the determination result of the above S49 is NO, image information with a frame number "i" to a frame number "b" is added to the reproduction list "C" (S52) and the present flow is ended. In other words, input by the user is not accepted until the addition of image information to the reproduction list "C" is completed.

By the above processes, the image with the frame number "X" is reproduced when the "Right" button or the "Left" button of the cross shaped button is pressed while the addition process of image information to the reproduction list "C" is executed as well as the frame number "X" then is included in one of the reproduction lists "A", "B" or "C".

Additionally, although the process when the "Right" button or the "Left" button of the cross shaped button is pressed during execution of the addition process of image information to the reproduction list "C" has been explained, the same processes are executed when the "Right" button or the "Left" button of the cross shaped button are pressed during the creation process of the reproduction list "C" which is executed in the case that the reproduction list "C" does not exist in S9 or S14. Also, it is possible that the same processes are executed when the "Right" button or the "Left" button of the cross shaped button are pressed during the creation process of the reproduction list "A" or the reproduction list "B", in the above S2 (see FIG. 5).

As explained above, according to the present embodiment, lists are respectively created for a group including the latest (the last) image file and a group, including the first image file in the case that the number of image files (image data) recorded in the recording medium is large, so that reproduction of images can be realized with swift switching from the last frame to be reproduced to the first frame to be reproduced, and conversely from the first frame to be reproduced to the last frame to be reproduced.

Second Embodiment

Next, an electronic camera to which an image displaying device according to a second embodiment is applied is explained.

The configuration of the electronic camera according to the present embodiment is the same as that of the electronic camera according to the first embodiment, however, some operations are different. Accordingly, only such operations are explained here.

Figure 8:
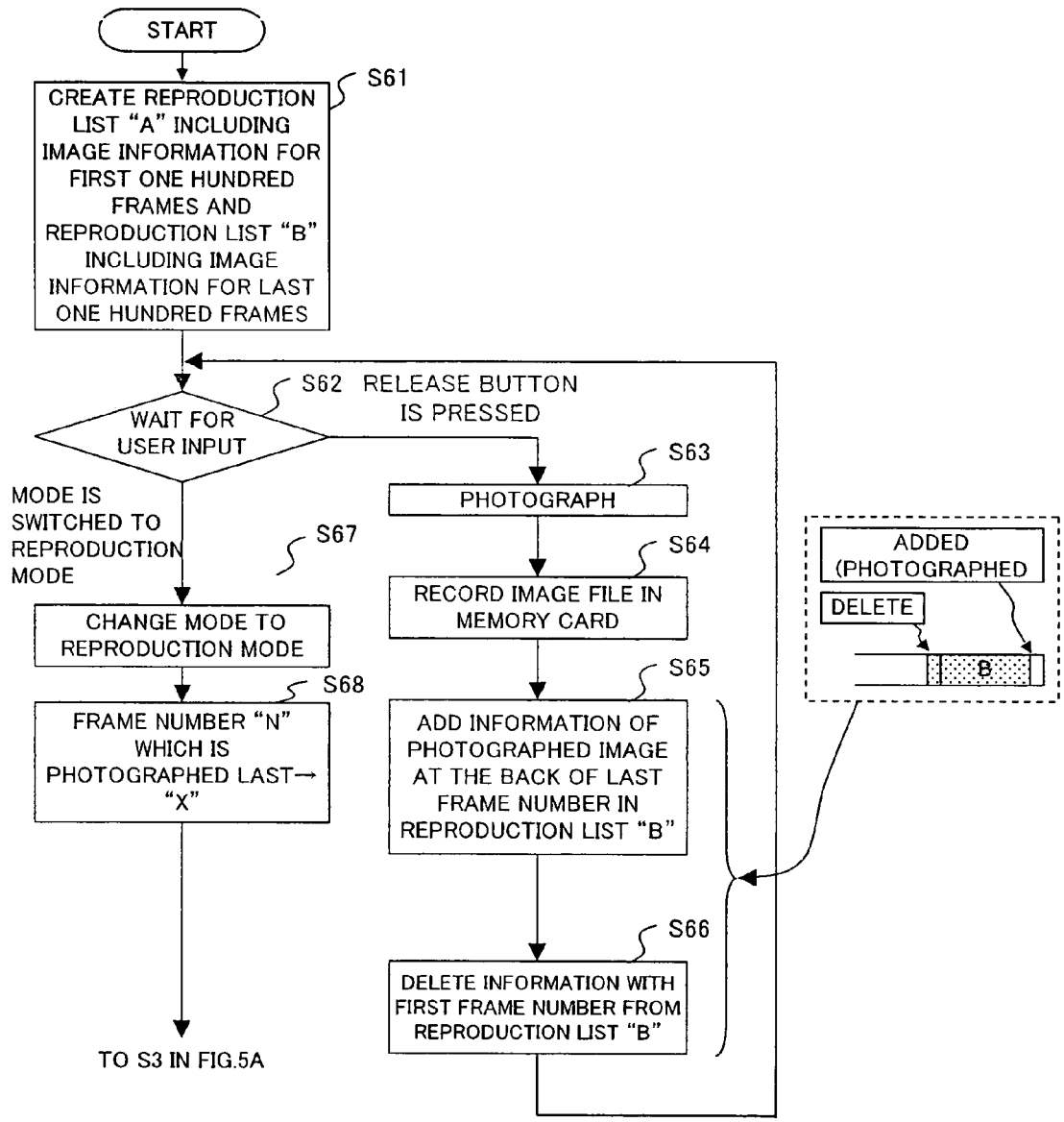
FIG. 8 is a flowchart showing an example of operations of the electronic camera according to a second embodiment.

FIG. 8 is a flowchart showing an example of operations of the electronic camera according to the present embodiment. The flowchart shows operations conducted when the power supply of the electronic camera is turned on, or when the detachable memory 9 is replaced by a different one while the power supply is in the on state. It is to be noted that processes the same as those shown in the above FIG. 5A are denoted by the same step numbers.

Additionally, it is assumed that when the power supply is turned on or when the detachable memory 9 is replaced by a different one while the power supply is in the on state, the mode is in a photography mode in the electronic camera according to the present embodiment.

As shown in FIG. 8, when the present operation starts, initially the reproduction list "A" including image information for one hundred frames, located at the back of, and including, the frame number "1", and the reproduction list "B" including image information for one hundred frames, located in front of, and including, the frame number "N" are created (S61) so that both of the reproduction lists "A" and "B" are stored in the built-in RAM 13.

Next, the process waits for the input of instructions from a user (S62) and when it is detected that the release button is pressed, a photography process is executed (S63) and thus obtained image data is recorded as an image file in the detachable memory 9 (S64). Image information of the image file recorded in S64 is added as image information with a frame number located consecutively at the back of the last frame number in the reproduction list "B" (S65), thereafter, image information with the first frame number in the reproduction list "B" is deleted (S66). In other words, in S65 and S66, image information of the image file recorded in S64 is added to the back of the reproduction list "B" and the top (the first) image information in the reproduction list "B" is deleted as shown in the figure enclosed by a dashed line.

The process returns to S62 after the completion of S66.

However, when it is determined that the mode switching switch is used for switching to the reproduction mode in S62, the mode is changed to the reproduction mode (S67) and frame number "N" which is the frame number for the image file last recorded in the detachable memory 9 is set as "X" which is the frame number to be reproduced (S68).

The process S3 and the subsequent processes to be executed after S68 are the same as those shown in the above FIG. 5A, FIG. 6A, FIG. 6B and FIG. 7 so that the explanation thereof is omitted here.

As explained above, according to the present embodiment, each time an additional image file (image data) is recorded to the recording medium, image information of the image file is added, and also, image information of the same amount as the added image information is deleted. Accordingly, a list of image files regarding a group of the latest image files can always be created.

Additionally, in the present embodiment, it is also possible that the electronic camera comprises a communication I/F for allowing transmission/reception of data with external devices so that the previously described processes of S65 and S66 are executed when an image file (image data) transmitted from the external devices such as, for example, a personal computer or the like via the communication I/F is recorded in the detachable memory 9. Specifically, it is also possible that when an image file transmitted from an external device is recorded in the detachable memory, image information of the transmitted image file is added as image information with a frame number located consecutively at the back of the last frame number in the reproduction list "B", and image information with the first frame number in the reproduction list "B" is deleted.

Third Embodiment

Next, an electronic camera to which an image displaying device according to a third embodiment is applied is explained.

The configuration of the electronic camera according to the present embodiment is the same as that of the electronic camera according to the first embodiment, however, some operations are different. Therefore, only such operations are explained here.

Figure 9A:
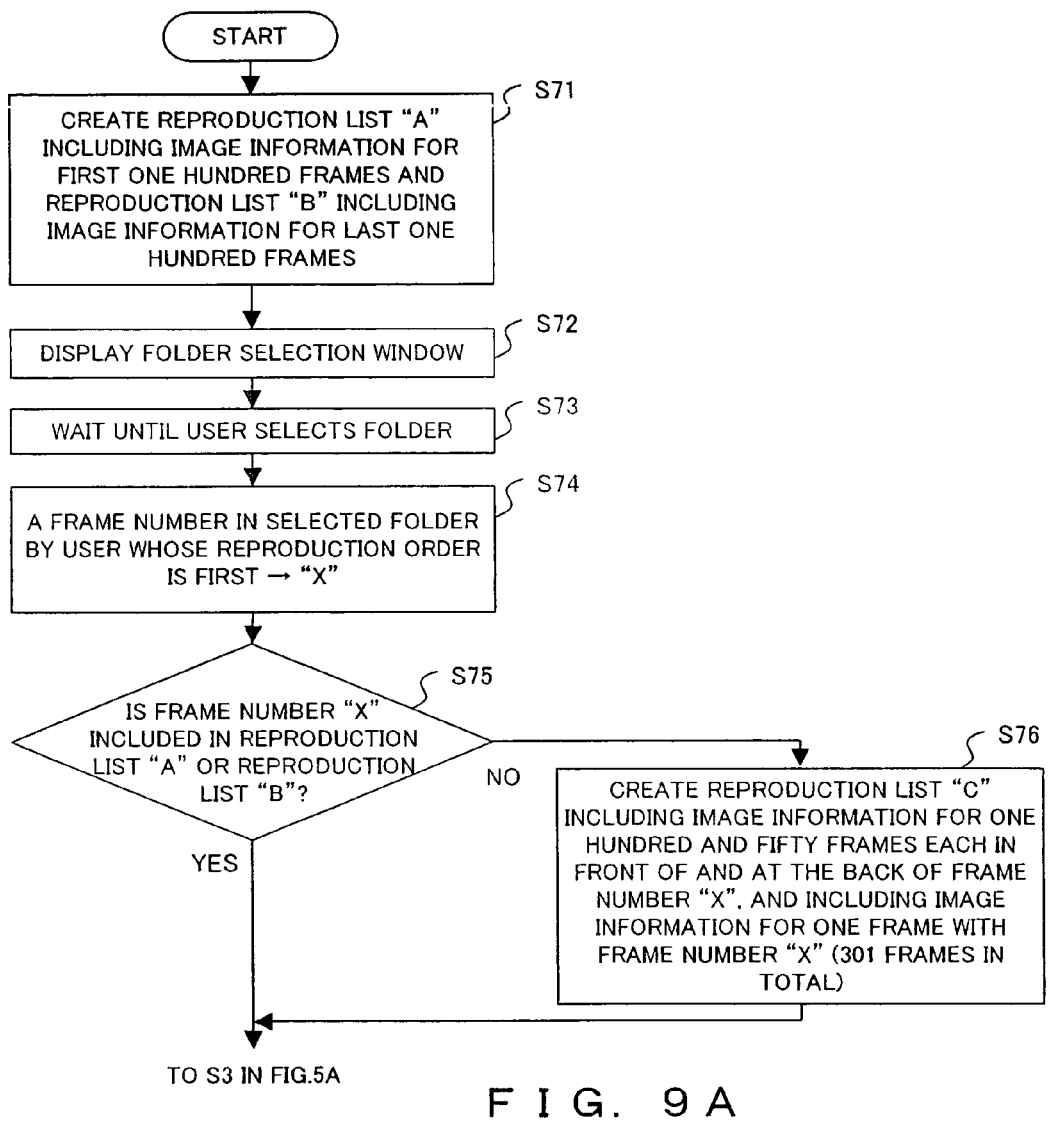
FIG. 9A is a flowchart showing an example of operations of the electronic camera according to a third embodiment.

FIG. 9A is a flowchart showing an example of operations of the electronic camera according to the present embodiment. The flowchart shows operations conducted when the mode is set to reproduction mode. It is to be noted that, in FIG. 9A, the processes that are the same as those shown in the above FIG. 5A are denoted by the same step numbers.

Figure 9B:
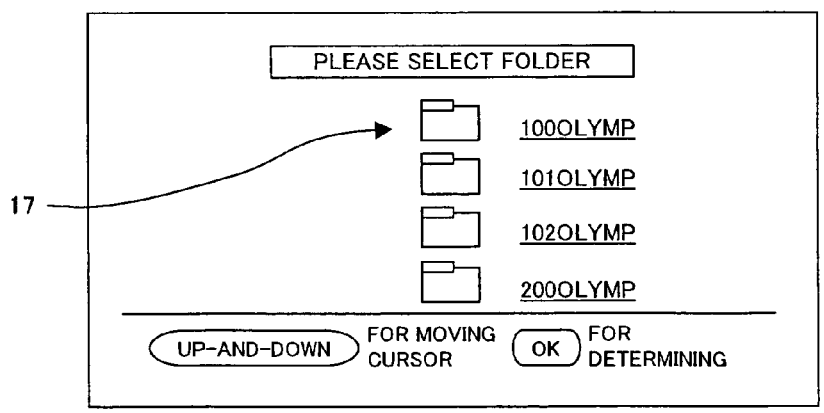
FIG. 9B shows an example of a folder selection window.

The FIG. 9B shows an example of a folder selection window displayed while the present processes are executed.

As shown in FIG. 9A, when the present operation starts, initially the reproduction list "A" including image information for one hundred frames, located at the back of, and including, the frame number "1", and the reproduction list "B" including image information for one hundred frames, located in front of, and including, the frame number "N" are created (S71) so that both of the reproduction lists "A" and "B" are stored in the built-in RAM 13.

Next, the folder selection window is displayed on a built-in LCD (S72) and the process waits until a user selects a desired folder (S73).

Here, an example of the folder selection window is shown in FIG. 9B. As shown in FIG. 9B, folders recorded in the detachable memory 9 are displayed as the folder selection window on the built-in LCD 12. A user can move a cursor 17 in the up-and-down directions by pressing the "Up and Down" buttons of the cross shaped button, and can specify a desired folder in this selection window. Further, the user can select (determine) the folder specified by the cursor 17 by pressing the "OK" button. For example, when the "OK" button is pressed, a folder "100OLYMP" is selected in this example.

When the desired folder is selected by the user as above, a frame number of an image file which belongs to the selected folder and whose reproduction order is the first is subsequently set as "X" (S74). Thereby, the frame number of the image file which is to be reproduced and displayed is set. In addition, examples of "a frame number of an image file which belongs to the selected folder and whose reproduction order is the first" include a frame number of the image file last stored in the selected folder.

Next, it is determined whether or not the frame number "X" is included in the reproduction list "A" or the reproduction list "B" (S75). When the determination result of the above S75 is NO, the reproduction list "C" including image information for one frame with the frame number "X" and for one hundred and fifty frames located consecutively in front of the frame number "X" and for one hundred and fifty frames located consecutively at the back of the frame number "X" is created (S76) and stored in the built-in RAM 13.

The process of S3 and the subsequent processes which are to be executed when the determination result of the above S75 is YES or to be executed after the process of S76 are the same as those shown in previously described FIG. 5A, FIG. 6A, FIG. 6B and FIG. 7, therefore, the explanation thereof is omitted here.

Additionally, although a process when the "Right" button or the "Left" button of the cross shaped button is pressed while the addition process of image information to the reproduction list "C" is executed has been explained in the above FIG. 7, the same process can be executed also when the "Right" button or the "Left" button of the cross shaped button is pressed during the creation process of the reproduction list "C" in the above S76.

As above, according to the present embodiment, when the reproduction of frames to be reproduced in the prescribed number is completed, a new reproduction list is created in advance on the assumption that reproduction is to be continued further so that even after all of the prepared frames to be reproduced in the reproduction list being currently used have been displayed, further images can be displayed smoothly in response to further continued reproduction by referring to the new reproduction list. Also, because the reproduction list is created for image frames in the appropriate frame range in accordance with a demand, the reproduction list can be created in a reduced time and with a smaller capacity of memory.

In addition, input by a user can be accepted even while the addition process of image information to the reproduction list is executed.

Further, in the present embodiment, the frame number of the image file to be displayed first when the reproduction mode is set is the frame number of the image file belonging to the folder selected by a user which is the frame number whose reproduction order is first (see S74), however, the above frame number of the image file to be displayed first can be a frame number of the image file which was reproduced and displayed last during the previous reproduction mode, for example. Specifically, the above frame number of the image file to be displayed first can be the frame number of the image file which was reproduced and displayed last during the reproduction mode which was set before the currently set reproduction mode.

Fourth Embodiment

Next, an electronic camera to which an image displaying device according to a fourth embodiment is applied is explained.

The configuration of the electronic camera according to the present embodiment is the same as that of the electronic camera according to the first embodiment, however, some operations are different. Therefore, only such operations are explained here.

Figure 6A:
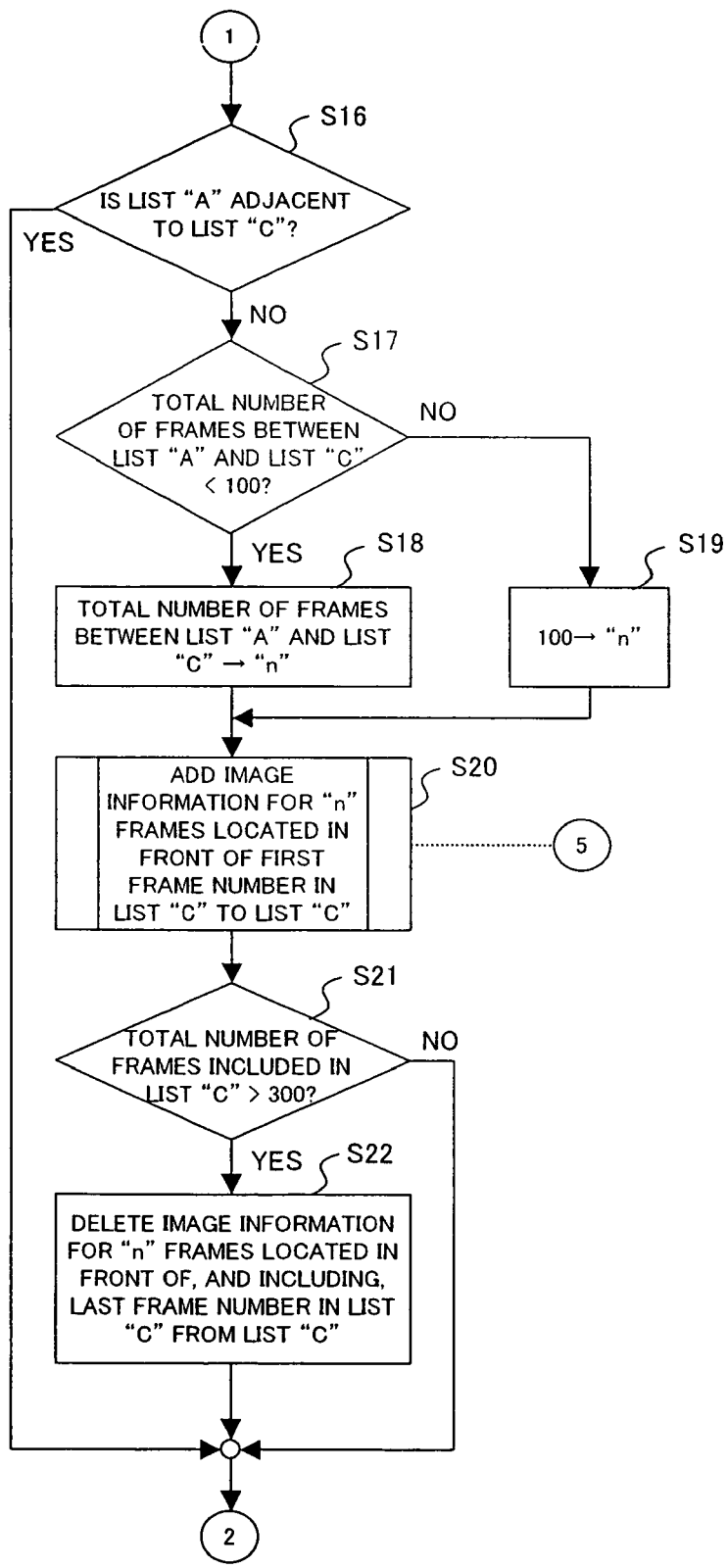
FIG. 6A is a second flowchart showing an example of operations of the electronic camera according to the first embodiment.
Figure 6B:
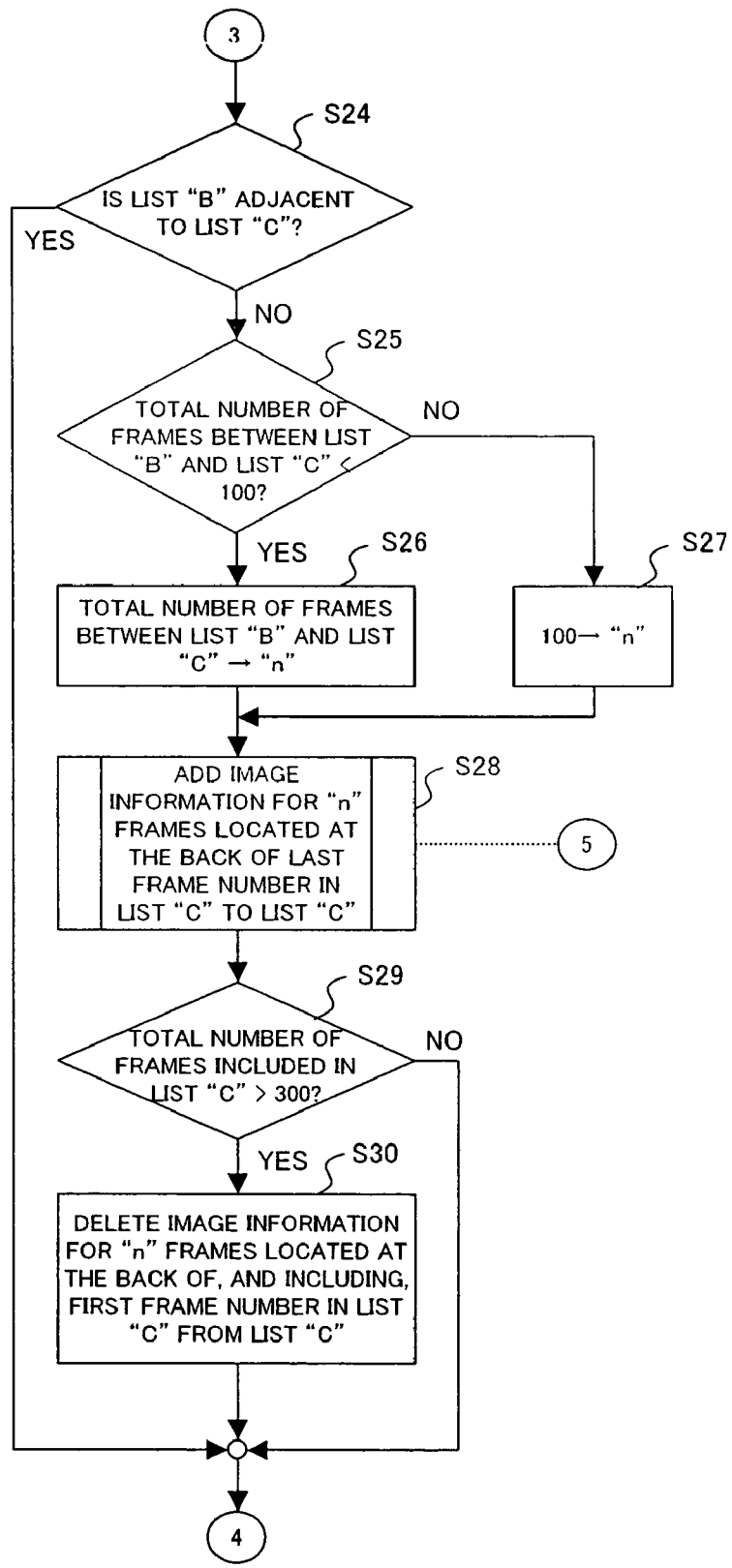
FIG. 6B is a third flowchart showing an example of operations of the electronic camera according to the first embodiment.

In the present embodiment, even during the processes of the above S9, S14 of FIG. 5, S20 of FIG. 6A and S28 of FIG. 6B, it can be detected that the "Right" button or the "Left" button of the cross shaped button is pressed. When such a condition is detected, the corresponding image can be displayed under prescribed conditions. Also, it is possible that the addition process of image information to the reproduction list "C" as the process to be executed in the above steps is cancelled.

Figure 10:
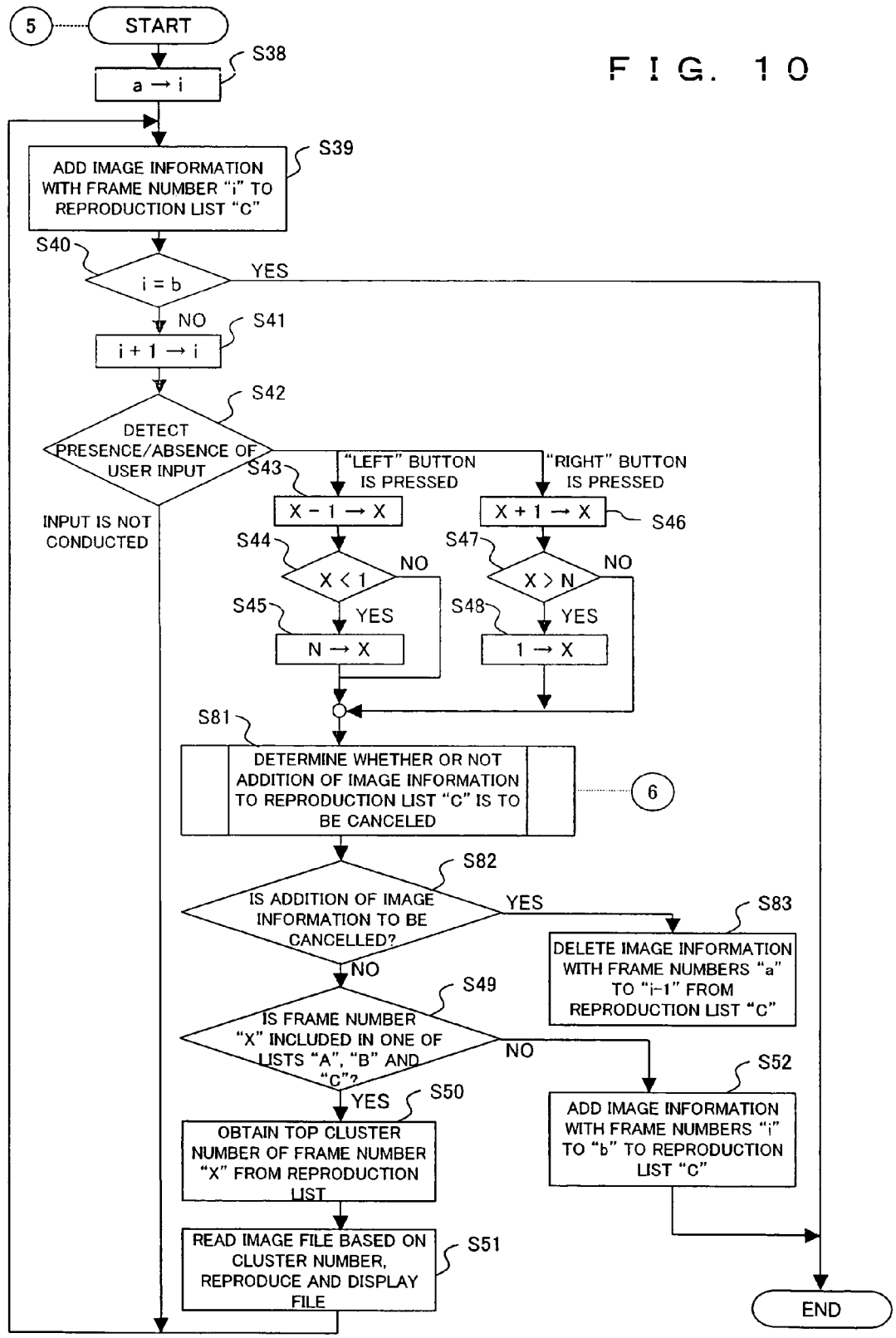
FIG. 10 is a first flowchart showing an example of operations of the electronic camera according to a fourth embodiment.

FIG. 10 is a flowchart showing each process of S9, S14, S20 and S28 according to the present embodiment. Note that FIG. 10 corresponds to the above FIG. 7, and in FIG. 10, the processes that are the same as those shown in FIG. 7 are denoted by the same step numbers.

In FIG. 10, after the processes of S38 to S48 which have already been explained are completed, in the present embodiment, a process is executed in which it is determined whether or not the addition process of image information to the reproduction list "C" is to be canceled (a process which will be described later in detail, referring to FIG. 11A) (S81). And, it is determined whether or not the process result of S81 is the determination result that the above addition process is to be cancelled (S82), and when the determination result is YES, the added image information with frame number "a" to frame number "i" is deleted from the reproduction list "C" (S83), thereafter, the present flow is ended. Thereby, when the above determination result specifies cancellation, the reproduction list "C" returns to the state before the addition of the image information so that the image information of frame number "a" to frame number "i" is not added to the reproduction list "C".

Conversely, when the determination result of the above S82 is NO, the process of S49 and the following processes which have already been explained are executed. Specifically, it is determined whether or not the frame number "X" is included in one of the reproduction lists "A", "B" and "C" (S52), and when the determination result is YES, the top cluster number of the frame number "X" is obtained from the reproduction list (S53) and the corresponding image file is read from the detachable memory 9 so that the image of the file is displayed on the built-in LCD 12 (S54). Thereafter the process returns to S39. Thereby, when the determination result is that the cancellation is not to be conducted, and the frame number "X" is included in one of the reproduction lists "A", "B" or "C" the image corresponding to the frame number "X" is displayed.

Conversely, when the determination result of the above S52 is NO, the image information of frame number "i" to frame number "b" is added to the reproduction list "C" (S55), and the present flow is ended. Thereby, when the determination result is that the cancellation is not to be conducted, and the frame number "X" is not included in one of the reproduction lists "A", "B" or "C", input of instructions by a user is not detected until the addition of image information to the reproduction list "C" is completed.

Figure 11A:
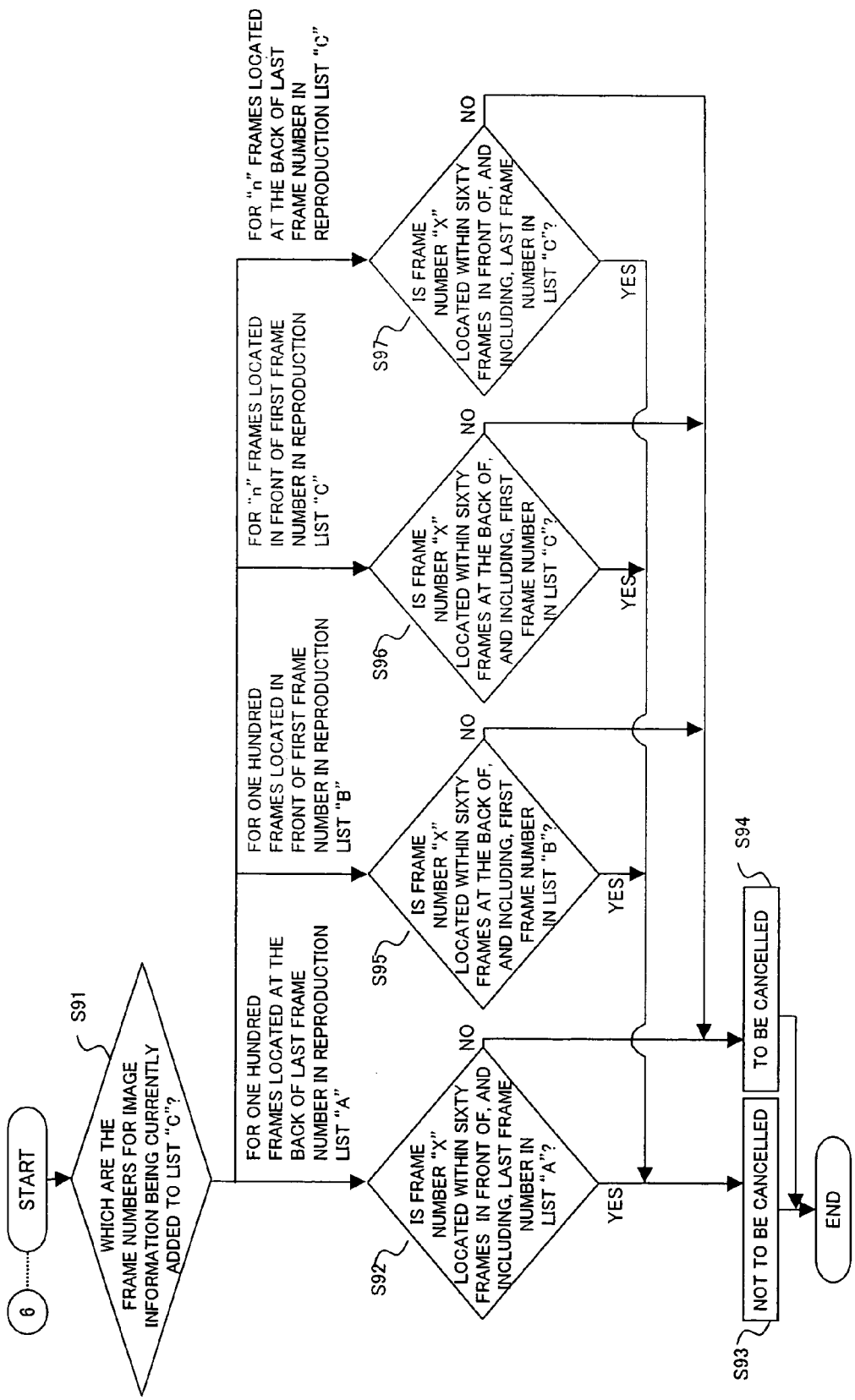
FIG. 11A is a second flowchart showing an example of operations of the electronic camera according to the fourth embodiment.

FIG. 11A is a flow chart for the process of the above S81. FIG. 11B, FIG. 11C, FIG. 11D and FIG. 11E show concepts of the reproduction lists related to the process.

As shown in FIG. 11A, initially in the process, it is determined which the frame numbers for the image information being currently added to the reproduction list "C" are for, among the image information for one hundred frames located consecutively at the back of the last frame number in the reproduction list "A" the image information for one hundred frames located consecutively in front of the first frame number in the reproduction list "B", the image information for "n" frames located consecutively in front of the first frame number of the reproduction list "C" and the image information for "n" frames located consecutively at the back of the last frame number in the reproduction list "C" (S91).

Figure 11B:
FIG. 11B is a first figure showing the concept of the reproduction lists related to the process shown in FIG. 11A.

When, in the determination of the above S91, it is determined that the frame numbers of the image information being currently added to the reproduction list "C" are for the image information for one hundred frames located consecutively at the back of the last frame number in the reproduction list "A" as-shown in FIG. 11B, it is subsequently determined whether or not the frame number "X" is within sixty frames located consecutively in front of, and including, the last frame number in the reproduction list "A" (S92), if the determination result is YES, it is determined, as a process result, that the cancellation of addition is not to be conducted (S93), if however the determination result is NO, it is determined, as a process result, that the cancellation of addition is to be conducted (S94), thereafter, the present flow is ended.

Figure 11C:
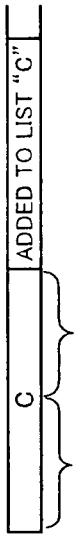
FIG. 11C is a second figure showing the concept of the reproduction lists related to the process shown in FIG. 11A.

When, in the determination of the above S91, it is determined that the frame numbers of the image information being currently added to the reproduction list "C" are for the image information for one hundred frames located consecutively in front of the first frame number in the reproduction list "B" as shown in FIG. 11C, it is subsequently determined whether or not the frame number "X" is within sixty frames located consecutively at the back of, and including, the first frame number in the reproduction list "B" (S95), and when the determination result is YES, it is determined, as a process result, that the cancellation of addition is not to be conducted (S93), and when the determination result is NO, it is determined, as a process result, that the cancellation of addition is to be conducted (S94), thereafter, the present flow is ended.

Figure 11D:
FIG. 11D is a third figure showing the concept of the reproduction lists related to the process shown in FIG. 11A.

When, in the determination of the above S91, it is determined that the frame numbers of the image information being currently added to the reproduction list "C" are for the image information for "n" frames located consecutively in front of the first frame number in the reproduction list "C" as shown in FIG. 11D, it is subsequently determined whether or not the frame number "X" is within sixty frames located consecutively at the back of, and including, the first frame number in the reproduction list "C" (S96), and when the determination result is YES, it is determined, as a process result, that the cancellation of addition is not to be conducted (S93), and when the determination result is NO, it is determined, as a process result, that the cancellation of addition is to be conducted (S94), thereafter, the present flow is ended.

Figure 11E:
FIG. 11E is a fourth figure showing the concept of the reproduction lists related to the process shown in FIG. 11A.

When, in the determination of the above S91, it is determined that the frame numbers of the image information being currently added to the reproduction list "C" are for the image information for "n" frames located consecutively at the back of the last frame number in the reproduction list "C" as shown in FIG. 11E, it is subsequently determined whether or not the frame number "X" is within sixty frames located consecutively in front of, and including, the last frame number in the reproduction list "C" (S97), and when the determination result is YES, it is determined, as a process result, that the cancellation of addition is not to be conducted (S93), and when the determination result is NO, it is determined, as a process result, that the cancellation of addition is to be conducted (S94), thereafter, the present flow is ended.

Further, in the present embodiment, processes to be conducted when the "Right" button or the "Left" button of the cross shaped button is pressed during the addition process of image information to the reproduction list "C" have been explained by using FIG. 10 and FIG. 11A to FIG. 11E, however, the same processes are conducted also when the "Right" button or the "Left" button of the cross shaped button are pressed during a creation process of the reproduction list "C" which is executed in the case that the reproduction list "C" does not exist in the above S9 and S14 of FIG. 5A.

As above, according to the present embodiment, when the frame number "X" becomes the frame number which lies outside of the interval of frames at least in the prescribed number with the frame number of image information to be added to the reproduction list "C" as the "Right" button or the "Left" button is pressed by a user during the addition process of image information to the reproduction list "C", the addition process of image information to the reproduction list "C" is cancelled. Accordingly, the image information which has a lower probability of being reproduced shortly is not stored in the built-in RAM 13. Therefore, the reproduction list can be efficiently created in a reduced time and with a smaller capacity of the memory and thus without waste and also, a smooth reproduction of images is realized without wasting time for reading data.

Also, as above, the addition process of image information to the reproduction list "C" is cancelled even during the above addition process under prescribed conditions as the "Right" button or the "Left" button is pressed by a user so that a situation is avoided where the process of adding image information for "n" frames located consecutively in front of the first frame number in the reproduction list "C" and the process of adding image information for "n" frames located consecutively at the back of the last frame number in the reproduction list"C" are simultaneously conducted. Accordingly, the load on the system controller 5 can be reduced.

Further, the number of frames serving as a threshold value for determining whether or not the addition of image information to the reproduction list "C" is to be conducted (e.g. fifty frames of S6 in FIG. 5A) is different from the number of frames serving as a threshold value for determining whether or not the addition process of image information to the reproduction list "C" is to be cancelled (e.g. sixty frames of S92 in FIG. 11A). Accordingly, the situation can be avoided where the addition and the deletion of image information are conducted too frequently as the "Right" button and the "Left" button are pressed when the frame number "X" is close to the threshold value so that the load on the system controller 5 can be reduced. Additionally, when occasion allows, such as when, for example, the processing capacity of the system controller 5 is sufficiently high, one and the same frame number can be employed for the above two values.

As above, the present invention has been explained in detail, however, it is to be naturally understood that the present invention is not limited to the above embodiments and various improvements and modifications can be allowed within the spirit of the present invention.

For example, in each of the above first to fourth embodiments, the reproduction lists "A", "B" and "C" are stored in the built-in RAM 13 independently of the detachable memory 9 storing image files. However, it is also possible that the above reproduction lists "A", "B" and "C" can be stored in the detachable memory 9 storing image files. In this case, at least while the electronic camera is in an activated state (while the power is in the on state), the reproduction lists "A", "B" and "C" are in a recorded and held state in the detachable memory 9.

Additionally, in each of the above first to fourth embodiments, it is also possible that the electronic camera comprises a plurality of card slots for realizing simultaneous insertion of the plurality of detachable memories so that reproduction lists "A", "B" and "C" for the image files stored in one detachable memory are recorded in other detachable memories.

Further, in each of the above first to fourth embodiments, the image displaying device according to the present invention is applied to the electronic camera, however, it is to be naturally understood that the present invention can be applied to other devices which can reproduce image files recorded in a recording medium, such as a PDA, a PHS, a mobile phone and the like, and further, the present invention can be applied to the image displaying device itself which reproduces image files recorded in a recording medium.

What is claimed is:

1. An image displaying device for reading image data which is assigned frame numbers from a recording medium in order to reproduce and display the image data, comprising:
a reproduction list creating unit for creating and registering a first reproduction list comprising a first frame number list corresponding to a first group of said image data, each image of the first image data being assigned a frame number provided in a first group of positive integers consecutive from frame number "1," and a second reproduction list in which a second frame number list of a second group of said image data, each image of the second image data being assigned a frame number provided in a second group of consecutive integers lying within a prescribed range in which a frame number decreases from a largest frame number and wherein the frame numbers of the first and second groups of frame numbers do not overlap;
a frame number setting unit for setting a frame number corresponding to image data to be reproduced and displayed;
a display for displaying the image data corresponding to the frame number set by the frame number setting unit; and
an image changing unit for reading a frame number corresponding to the set frame number from one of the first reproduction list and the second reproduction list and changing image data being currently displayed on the display to a display of the image data corresponding to the read frame number set by the frame number setting unit, wherein
the image changing unit reads from the recording medium image data corresponding to the largest frame number in the second reproduction list, and changes image data corresponding to the frame number "1" being currently displayed on the display to a display of the image data corresponding to the largest frame number registered in the second reproduction list when image data with the frame number "1" is displayed on the display and the frame number setting unit is operated so that a frame number is set in a decreasing direction, and
the image changing unit reads, from the recording medium, image data corresponding to the frame number "1" from the first reproduction list and changes the image data with the largest frame number being currently displayed on the display to the image data corresponding to the frame number "1" when image data corresponding to the largest frame number is displayed on the display and the frame number setting unit is operated so that a frame number is set in an increasing direction.

2. The image displaying device according to claim 1, wherein:

the first reproduction list and the second reproduction list are created when the power supply is powered on for the first time or when a reproduction mode is set for the first time.

3. The image displaying device according to claim 1, wherein:
the first reproduction list and the second reproduction list are created and held in another recording medium at least while the image displaying device is in an activated state.

4. The image displaying device according to claim 1, wherein:
the first reproduction list and the second reproduction list are created and held in another recording medium even when the power supply is turned off.

5. The image displaying device according to claim 3, wherein:
the another recording medium is a random access memory (RAM).

6. The image displaying device according to claim 1, wherein,
the reproduction list creating unit is configured so that,
in the case that the frame number setting unit is operated so that frame numbers are selected in an increasing direction while image data corresponding to frame numbers in the first reproduction list are displayed on the display and so that the number of remaining frames in the first reproduction list becomes equal to or less than a prescribed number, a third reproduction list is created in which data including prescribed frame numbers which are consecutive from the largest frame number registered in the first reproduction list and not overlapping with frame numbers in the second reproduction list.

7. The image displaying device according to claim 1, wherein,
the reproduction list creating unit is configured so that,
in the case that the frame number setting unit is operated so that frame numbers are selected in a decreasing direction while image data registered in the second reproduction list is displayed on the display and that the number of remaining frames to be reproduced in the second reproduction list becomes equal to or less than a prescribed number, a third reproduction list is created in which data including prescribed frame numbers which are consecutive from the smallest frame number in the second reproduction list and not overlapping with frame numbers in the first reproduction list.

* * * * *